United States Patent
Jacobsen

(10) Patent No.: US 7,292,355 B2
(45) Date of Patent: Nov. 6, 2007

(54) DEVICE AND METHOD FOR SECURING PRINT JOBS STORED ON A PRINTER

(75) Inventor: Dana A. Jacobsen, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 789 days.

(21) Appl. No.: 10/301,118

(22) Filed: Nov. 20, 2002

(65) Prior Publication Data

US 2004/0095595 A1 May 20, 2004

(51) Int. Cl.
*G06F 15/00* (2006.01)
*H04N 1/44* (2006.01)

(52) U.S. Cl. .................... 358/1.13; 358/1.14

(58) Field of Classification Search ........... 358/1.15, 358/1.14, 1.16, 1.18; 713/151
See application file for complete search history.

(56) References Cited

U.S. PATENT DOCUMENTS

| | | | |
|---|---|---|---|
| 6,862,583 B1* | 3/2005 | Mazzagatte et al. | 705/64 |
| 6,999,588 B1* | 2/2006 | Oishi | 380/246 |
| 7,003,111 B2* | 2/2006 | Jaquette | 380/46 |

* cited by examiner

*Primary Examiner*—Gabriel Garcia

(57) ABSTRACT

A printer includes a local non-volatile memory for storing at least one print job; and a control system, including at least one processor and an encryption algorithm. When a print job is sent to the printer and designated for printing at a later time, the print job is assigned a key identification number (KEY) and then encrypted by the processor based on the encryption algorithm and the KEY. The encrypted print job is then stored in the local non-volatile memory as a secured print job, while the KEY associated with the encrypted print job is erased from the printer.

31 Claims, 8 Drawing Sheets

DEVICE AND METHOD FOR SECURING PRINT JOBS STORED ON A PRINTER

BACKGROUND

Today's more sophisticated printers possess capabilities far beyond those of printers produced only a few years ago. With the widespread use of intranets, business printers are now frequently capable of being networked so as to be accessible to any other device on the network. Consequently, a user can send a print job to any printer within his or her office, but also to any printer accessible by the user's network, regardless of its location.

Beyond networking, many of today's more sophisticated printers incorporate large amounts of memory, such as hard disc drives, for storing documents. This permits actions such as stored jobs and multiple original printing, or MOPying, as developed by Hewlett-Packard. After a document is submitted to the printer, it is rendered into a format that the print engine is capable of translating into a printed page. Then the data representing the rendered document can be printed at that time and/or saved in the printer's memory as a stored print job. Once saved, one or more users can approach the printer at a point later in time, recall the document from its memory, and print out one or more "copies" of the document.

Depending on the content of the document, security measures preventing access to it may be desired. For instance, a user generates a document containing sensitive and confidential financial information that should not be seen by the general employees or general public. Either by choice or necessity, the printer available to the user is at a different location than the user, such as across the room, in a different room, or even on the other side of the building. The user does not want the document to come out of the printer before he or she is physically present to retrieve it. Consequently, the user designates the document to be stored in the printer.

Alternatively, consider a scenario where the same user is responsible for generating a monthly financial report that only designated executives should have access to. The user could print out the report and forward a hardcopy to each of the executives, or could direct the report to the printers associated with each of the selected individuals to be either printed or stored. In any case, there is the risk of the report being seen by unauthorized personnel.

Current security measures involve the "locking" of a document and the use of a personal identification number or PIN. A user assigns a PIN to a document. The document file is then placed in a locked state when saved within the printer. Any attempt in the future to print the document requires the user to know the appropriate PIN associated with it. If an incorrect PIN is entered, the printer simply will not print the document.

Although the requirement of a PIN in order to print a document may be acceptable in situations where casual security measures are sufficient, it is insufficient in situations where more strict security is required. This is due to the fact that both the document and its associated PIN are both stored within the printer. A person with the appropriate knowledge could tamper with the printer and retrieve the PIN, thereby acquiring the capability to print the document. Alternatively, the document itself could be lifted off of, or copied from, the printer's memory. This may circumvent the PIN-based security system altogether, allowing the document to be viewed or printed elsewhere.

SUMMARY

A printer includes a local non-volatile memory for storing at least one print job; and a control system, including at least one processor and an encryption algorithm. When a print job is sent to the printer and designated for printing at a later time, the print job is assigned a key identification number (KEY) and then encrypted by the processor based on the encryption algorithm and the KEY. The encrypted print job is then stored in the local non-volatile memory as a secured print job, while the KEY associated with the encrypted print job is erased from the printer.

BRIEF DESCRIPTION OF THE DRAWINGS

Identical reference numbers in the drawings indicate similar, but not necessarily identical, elements.

DESCRIPTION

To better secure a document or print job that is stored in a printer, one aspect of the present invention provides a method of securing the print data in which the access key for the data is not retained in the printer. Consequently, accessing the printer will not allow an unauthorized person to obtain both the secured print data and the key for decrypting that print data.

Figure 1:
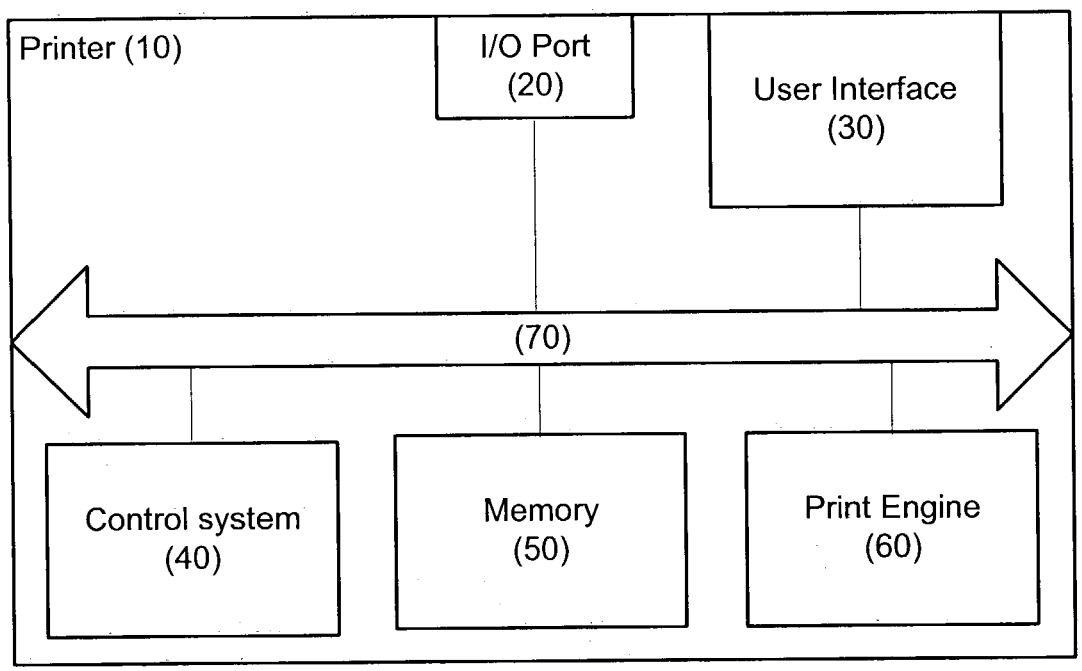
FIG. 1 is a simplified depiction of the general components of a printer according to one exemplary embodiment.

A simplified setup of a printer in accordance with one embodiment of the principles described herein is depicted in FIG. 1. A printer (10) includes an input-output (I/O) port (20), a user interface (30), a control system (40), memory (50), and a print engine (60). All these items are connected via a local interface or bus (70). Local interface (70) may include, for example, one or more data buses with accompanying control buses.

Printer (10) may also include other components not depicted, including components that supplement or enhance the printer functionality. For example, printer (10) could include a scanner that enables users to easily make copies or enter documents into the memory (50) of the printer (10).

The I/O port (20) allows the printer (10) to interface and communicate with one or more computing devices, such as a personal computer or workstation. The connection between the printer (10) and such a host device may be either direct or over a data network. If connected to a data network, the printer (10) may be capable of receiving print jobs from any computing device on or in communication with the data network. The I/O port (20) also enables printer (10) to transmit stored print jobs over a network to other devices, including other printers or an external memory device used for archiving data.

The user interface (30) of printer (10) can be comprised of various different user input devices and may include one or more local control panels that are accessible to walk-up users. Examples of devices that might be part of the user interface (30) include, but are not limited to, a Liquid Crystal Display (LCD) and a keypad or keyboard, or a touch-sensitive display screen.

Beyond the typical commands that control the basic print functions, user interface (30) may also provide access to functions relating to the storage of print jobs within the printer. This includes the ability of a user to input a key identification number (KEY) into printer (10) in order to print a secure document.

The print engine (60) includes the necessary hardware for enabling the printer (10) to controllably place marks on print media. The print media may be, for example, paper, cardstock, transparencies, etc. Based on the desired application, the print engine (60) can be designed to incorporate any of the numerous printing technologies available now or in the future. Some exemplary print technologies, provided for illustrative purposes, include laser printing, ink jet printing, dye sublimation printing, or thermal dye printing. As used herein and in the appended claims, the term "printer" will be used to refer to any device that outputs a hardcopy document using electronic data, including, but not limited to, laser printer, ink jet printers, dot matrix printers, facsimile machines, digital copiers, plotters, etc.

All data entering printer (10) is delivered to its control system (40), which may include one or more microprocessors, various memory devices and other hardware circuitry. The functions of control system (40) include converting a file directed to printer (10) into a format that can be handled by the print engine (60) for printing, such as a rendered image, and then controlling and coordinating the various components of printer (10) to place the rendered image onto the target print media. Beyond these routine printing functions, control system (40) also incorporates one or more encryption algorithms for securing print jobs that are to be stored within the printer (10).

Printer (10) is capable of storing one or more print jobs by means of its local memory (50). This permits a user to print one or multiple originals of a document from the data stored in local memory (50) at some point in time after submitting the print job to the printer (10) without having to resubmit the document to printer (10) by means of a computing device, such as a personal computer. Local memory (50) can include one or more hard disc drives, flashable read only memory (flash-ROM), or any other non-volatile storage device.

Figure 2:
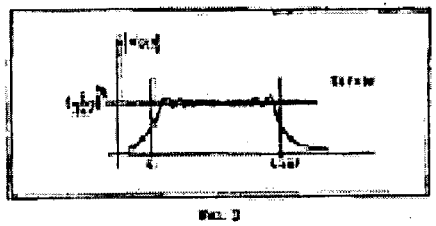
FIG. 2 is an example of an original document that is to be stored within and printed by a printer according to an exemplary embodiment.
Figure 2:
Figure 2:
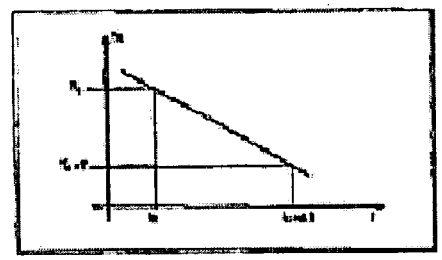
Figure 2:
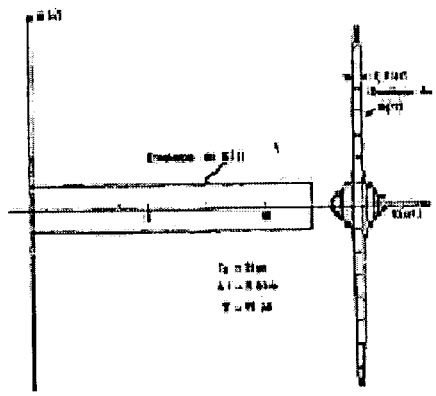
Figure 5:
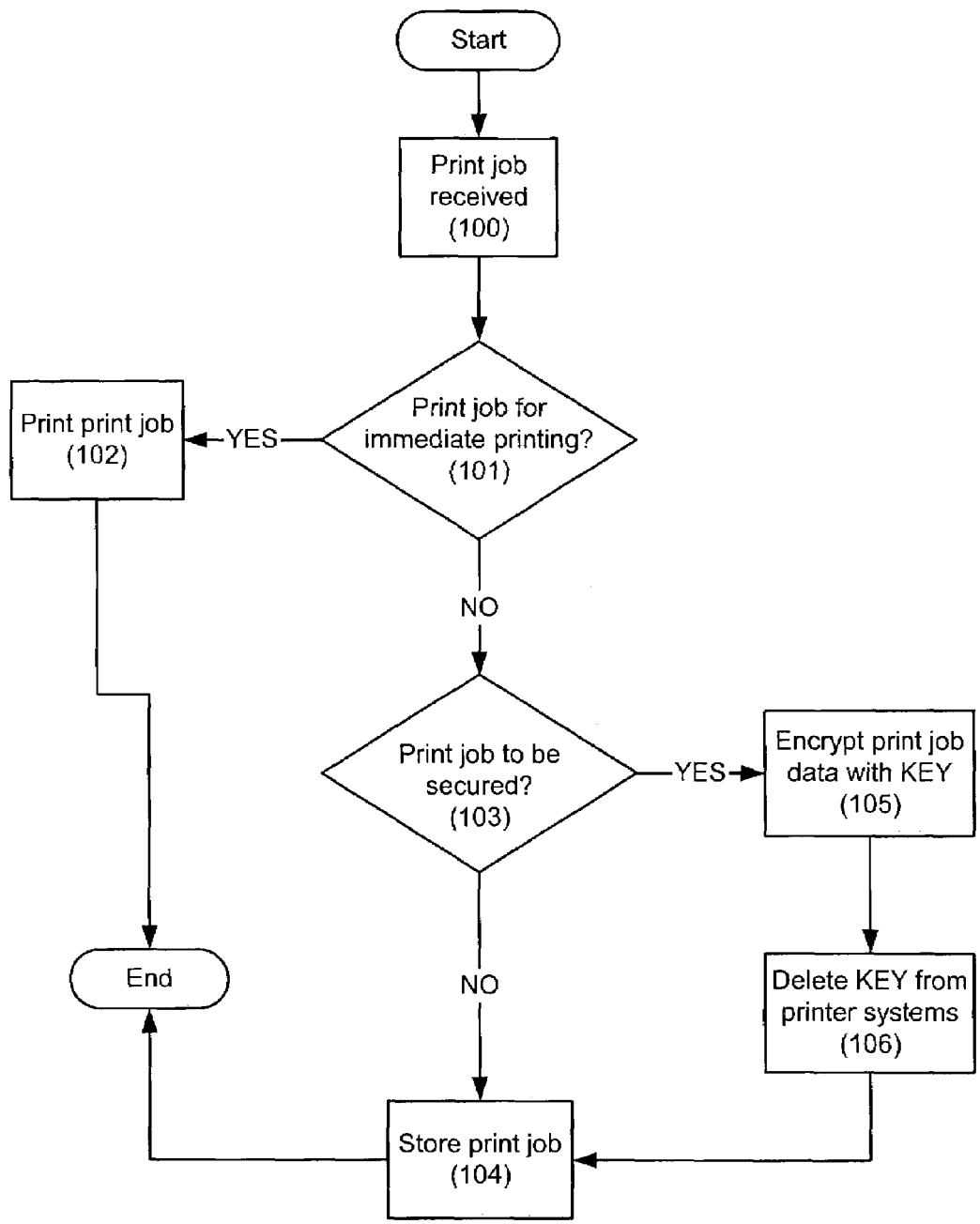
FIG. 5 is a flowchart illustrating a method of encrypting and storing a print job according to an exemplary embodiment.

The operation of a printer in accordance with principles described herein will now be described with reference to FIG. 5. First, a user creates or obtains a document using a computing device such as a personal computer. FIG. 2 depicts an exemplary document that will be used for illustrative purposes. We assume that the subject matter of the document of FIG. 2 such that the document owner wishes to restrict access to the document, in hardcopy or electronic form.

When the user desires a hardcopy of the document for personal use or use by someone else, the user activates the print command on the computing device where the document is stored and, if multiple printers are available through, for example, a network, selects which printer the document should be transmitted to. Typically, the printer driver application on the computing device will translate the document into a print job in a Page Description Language (PDL). The print job in PDL is then transmitted to the printer.

The user may also designate whether the document should be printed now, saved within the printer as a stored print job for a later printing, or both. Additionally, the user can elect to have the document encrypted for security purposes if it is to be saved within the printer. If encryption is elected, the user is requested to enter a key identification number (KEY) that will be associated with the document.

The data file representing the document is then forwarded to the printer, (step 100). The print job is then processed by the printer and converted into an appropriate format for printing. This processing may occur as soon as the document is received or may not be conducted until the document is to be submitted to the print engine (60) for printing. In other words, the printer (10) can store the document as received from the host computer in PDL or as further processed by the control system (40) for printing.

Rendering the PDL print job for printing by the print engine (60) is preferably carried out by one or more processors within system control (40) and typically involves, for example, "rasterizing" or "rendering" the PDL data into a collection of individual bits that make up the image to be printed. Once the processing has occurred, the print job is ready for printing. If the document is directed by the user for immediate printing only (determination 101), the processed print job is delivered to print engine (60) for immediate printing of the document (step 102).

Alternatively, the user may desire the ability to make one or multiple printings of the document sometime in the future. Or, the user may not want the document to print until he or she is physically present at the target printer. In such cases, the user can elect to have the document saved within the printer (10) and not immediately printed in hardcopy form. If this is the case, the data file representing the document is forwarded to printer (10) and then saved in the local memory (50) of printer (10) (step 104) with or without processing for use by the print engine (60).

If the document is sensitive in nature (determination 103), the user can elect to have the document secured by means of encryption (step 105). Encryption is carried out based on using an encryption algorithm contained within control system (40) and the KEY provided by the user as an input to the encryption algorithm. Any standard encryption technique can be applied. Some example encryption methods that can be utilized, provided for illustrative purposes, include the widely known Blowfish encryption algorithm, Data Encryption Standard (DES), and its successor, the Advanced Encryption Standard (AES).

Encryption can be performed on the PDL data as received from the host computing device or on rendered data that has been generated from the PDL data for use by the print engine (60). The KEY used for encryption can be input at the host computing device and transmitted with the print job to the printer. Alternatively, the KEY could be entered at the printer after the print job has been transmitted to the printer. This may allow a user to secure a print job that was inadvertently stored on the printer without the desired security.

Upon encryption, the print job data becomes statistically random in nature, thus no longer representing the original document. The encrypted print job is then saved into local memory (50) of printer (10) (step 104). Additionally, once the encryption process is complete, all traces of the KEY associated with the document are preferably erased from control system (40) and any other component of printer (10) that may have the KEY stored in some form (step 106). This effectively secures the document even if the printer 10 is tampered with. Because the document or the stored print job representing the document is encrypted, there is no concern of directly lifting it from memory (50) and thereby bypassing the requirement of a KEY to access and print the document. Further, as the KEY itself is no longer contained within printer (10), there is no concern that a person can retrieve the KEY through tampering with printer (10) and thereby printing the stored print job.

Figure 6:
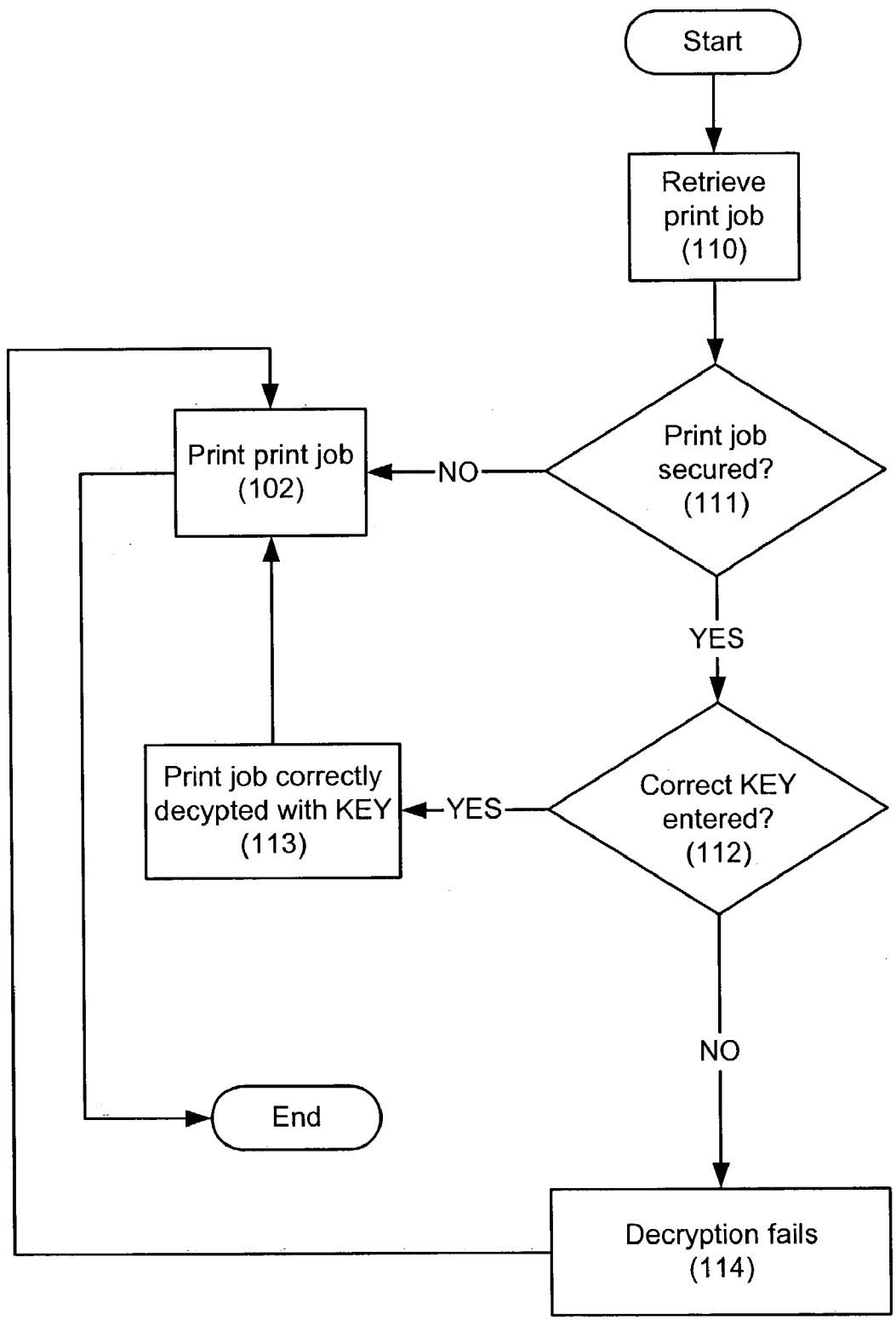
FIG. 6 is a flowchart illustrating a method of retrieving and printing a secured print job according to an exemplary embodiment.

Referring now to FIG. 6, in order to generate one or more prints of the secured document saved within printer (10) as a stored print job, a user is required to enter, at user interface (30), the KEY used to encrypt the document. For instance, if a first user wanted to print a confidential document, FIG. 2 for example, but wanted to make sure that only certain people could print the document, the user could send the document to one or more printers (10) as a secured stored print job using the method outlined in FIG. 5. Thus, after the print job was received in the printer (10), before or after rendering, the print job would be encrypted and saved into memory (50) of the one or more printers.

When the print job is retrieved (step 110) for printing, if the print job is secured (determination 111), the user requesting the print will have to input the correct KEY (determination 112). The KEY input by the user will be used as an input to the decryption algorithm. If the correct KEY is entered, the decryption algorithm will correctly or successfully decrypt the print job (step 113). The decrypted print job can then be printed (102). This may require rendering the print job if the decryption and storage of the print job was performed on the PDL data from the host computing device before rendering.

If no KEY or an incorrect KEY is input, the decryption of the print job will fail in that no intelligible data will be obtained when the decryption algorithm is run using the incorrect KEY (step 114). Consequently, the output of the decryption algorithm will be apparently random data. The printer will not necessarily be aware of whether the decryption was successful or unsuccessful. The printer can proceed to print the data from the failed decryption as though it were any other image for printing. (step 102). (See, e.g., FIG. 3).

In this manner, any unauthorized user would be unable to print and view the confidential document. If an attempt is made to print the document with an incorrect KEY, the printer (10) may simply print one or more pages of images comprised of the unencrypted data of the secured print job. An example of the appearance of such a page is illustrated in FIG. 3.

Figure 3:
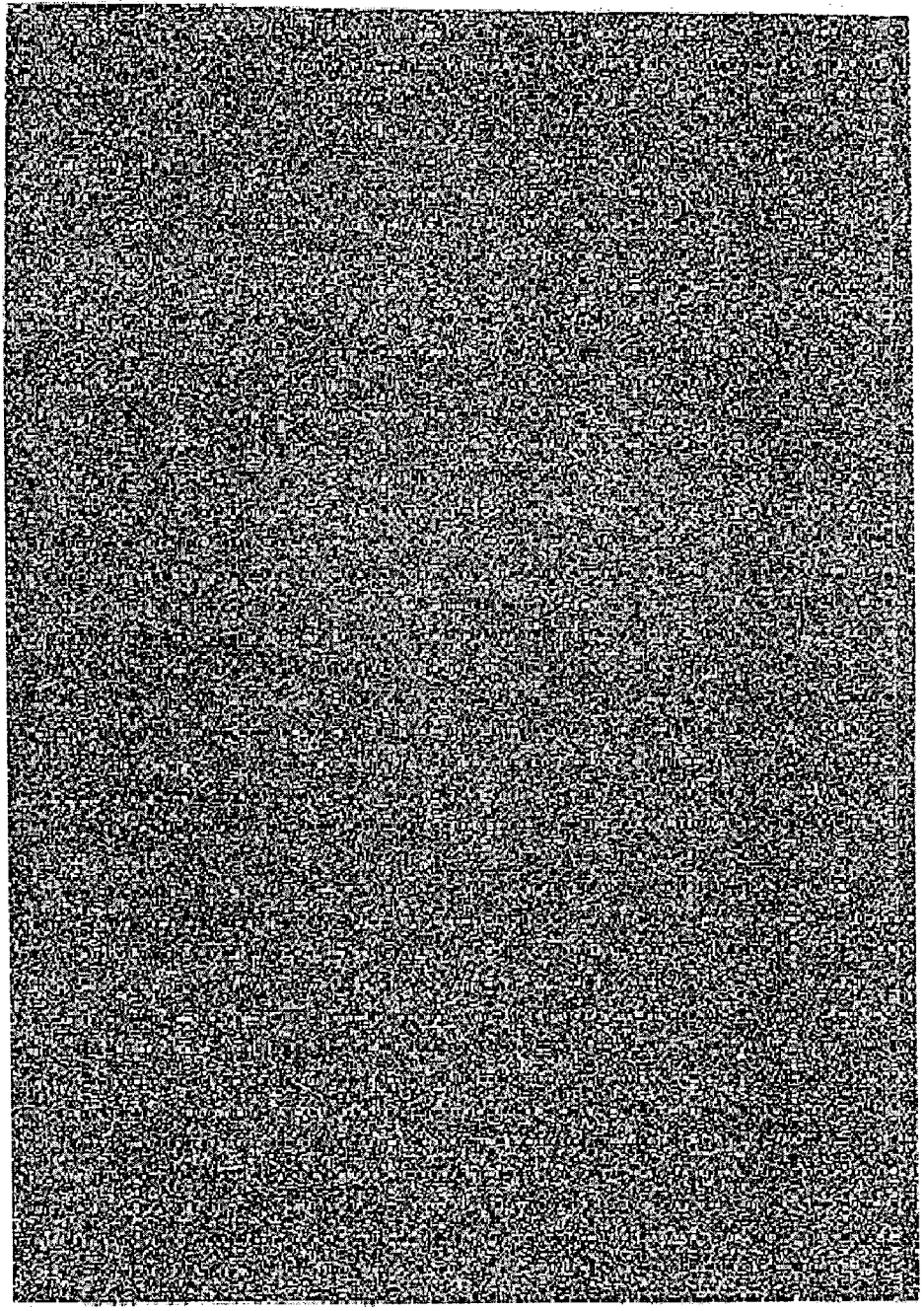
FIG. 3 is an example image of what the printer output would look like if there were an attempt to print the document of FIG. 2 utilizing an incorrect KEY according to an exemplary embodiment.
Figure 4:
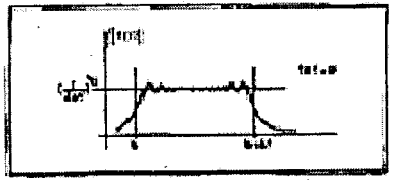
FIG. 4 is an example image of what the printer output would look like if the document of FIG. 2 were printed utilizing the correct KEY according to an exemplary embodiment.
Figure 4:
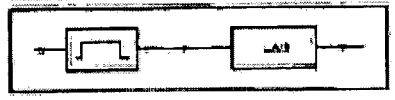
Figure 4:
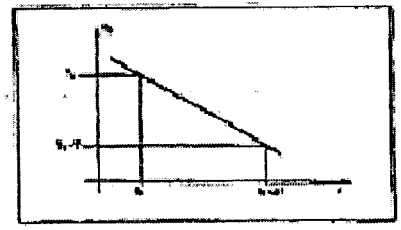
Figure 4:
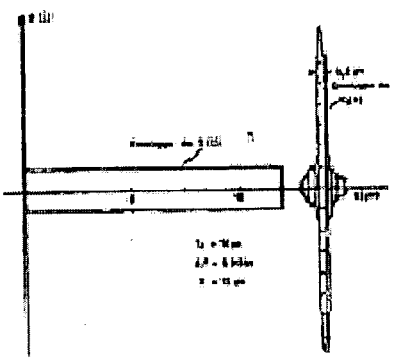

As can be appreciated by the appearance of the document in FIG. 3, it requires a substantial amount of time and printer resources to render a hardcopy of an incorrectly decrypted document, which resembles random data. Due to the long delays created by printing this sort of image, an unauthorized user is discouraged from attempting to guess the KEY. Only by knowing the correct key can a secured stored print job be accurately printed. Thus, in the above instance, only the first user and anyone the user has provided with the KEY would be capable of printing the confidential document. FIG. 4 depicts the confidential document after being decrypted and printed using the correct KEY. The printed document, illustrated in FIG. 4, is identical to the original document, illustrated in FIG. 2.

Figure 7:
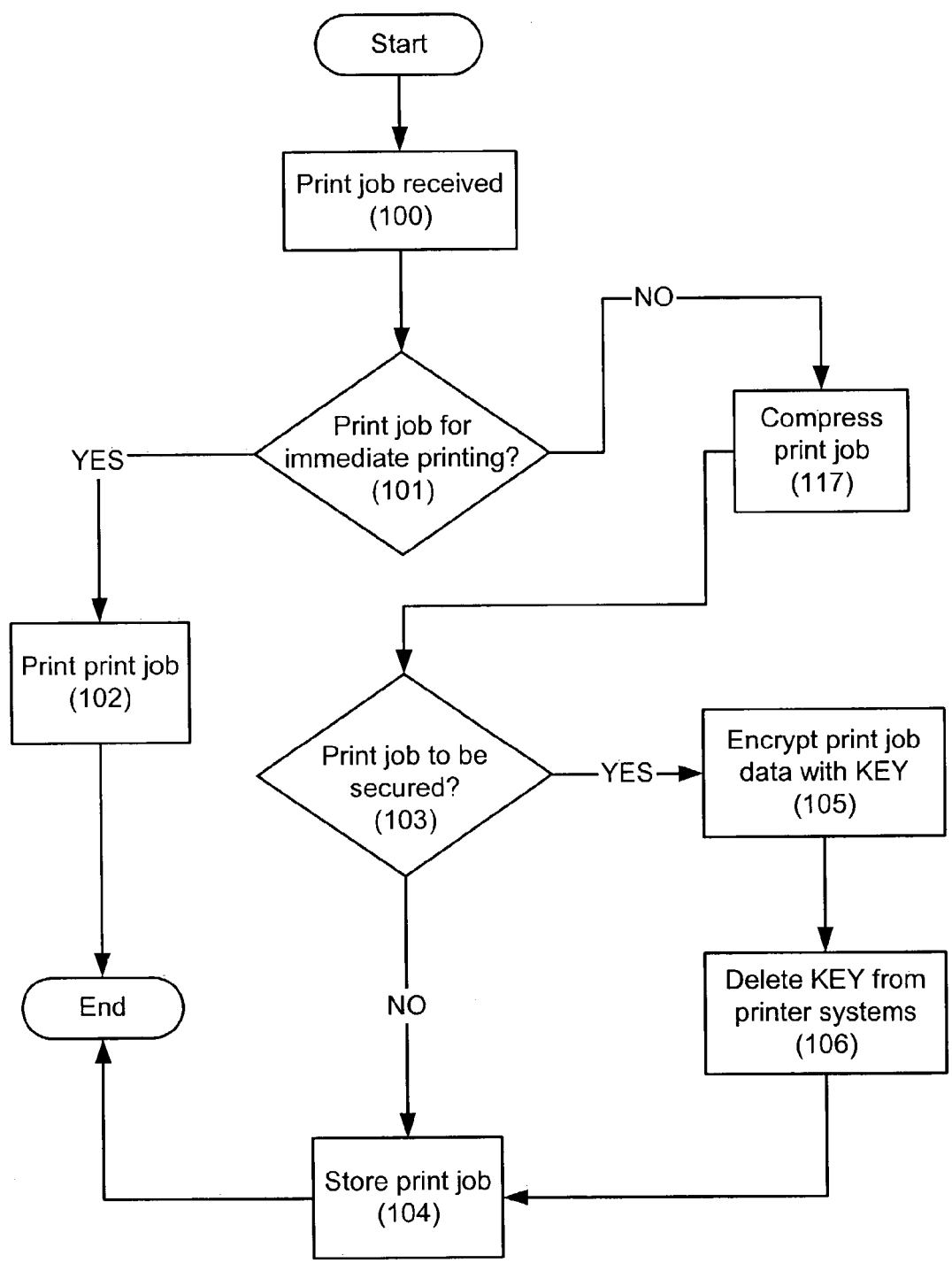
FIG. 7 is a flowchart illustrating a method of compressing, encrypting and storing a print job according to another exemplary embodiment.

According to another example of the principles described herein as illustrated in FIG. 7, data compression (step 117) could be utilized in order to reduce the size of stored print jobs, thereby conserving memory (50). However, after the encryption process, the print job is essentially composed of random data. As such, an encrypted print job will be nearly incompressible. Accordingly, any compression must be performed before the print job is encrypted.

Consequently, a document submitted to printer (10) would preferably undergo rendering for use by the print engine, and then undergo data compression. The compressed data file representing the print job can then be encrypted for security (step 105) and saved into memory (step 104).

Figure 8:
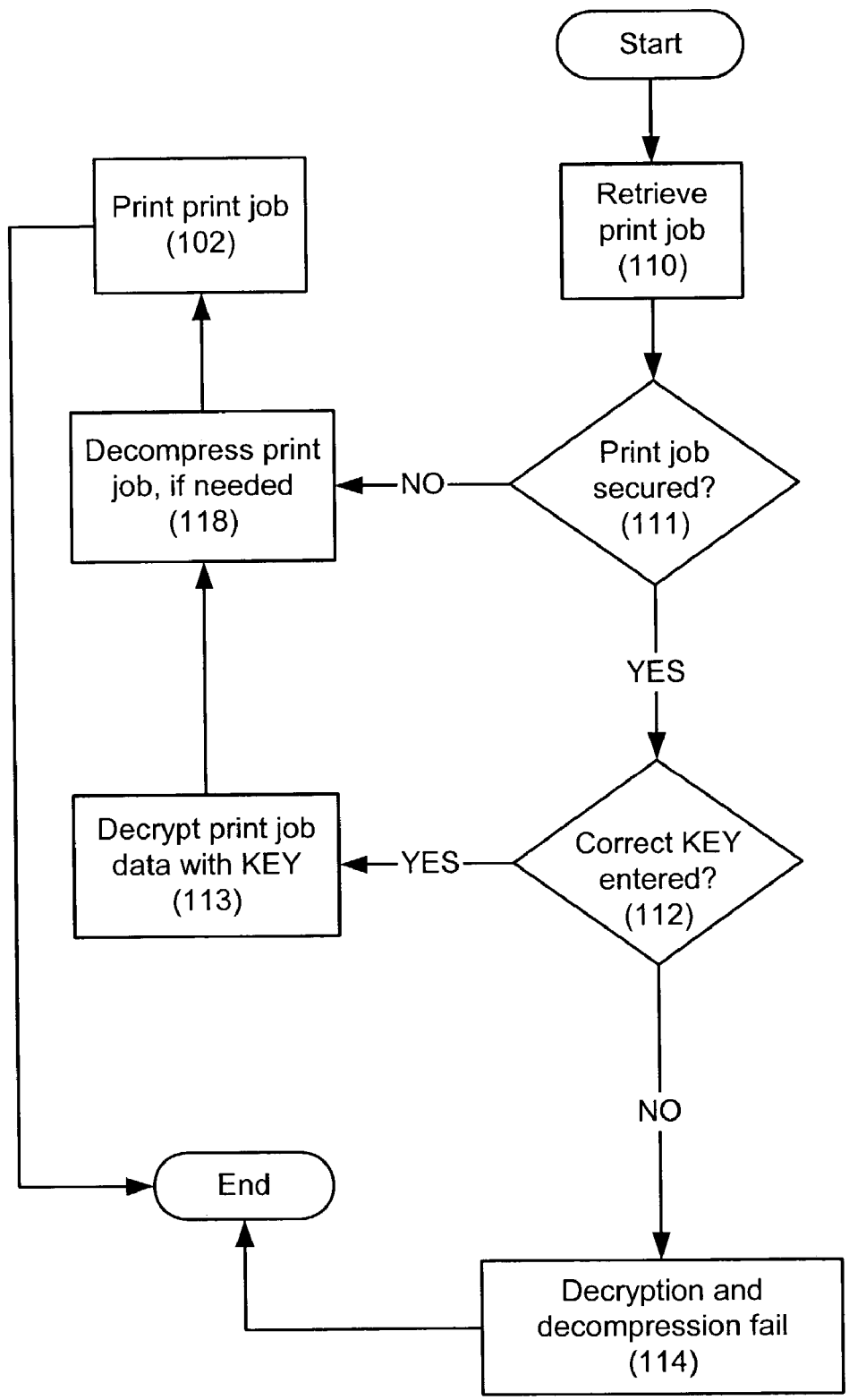
FIG. 8 is a flowchart illustrating a method of retrieving and printing a secured and, possible, compressed print job according to another exemplary embodiment.

Referring to FIG. 8, as in the embodiment described above, the correct KEY must be entered (determination 112) by a user before the document can be successfully printed. However, in this case, upon entering the correct KEY, the stored print job would automatically undergo both decryption (step 113) and then decompression (step 118). If an incorrect KEY is entered, the attempted decryption of the data will not reproduce the original, compressed data, but will produce essentially random data due to the use of the incorrect KEY. Consequently, the attempted decompression step will receive the essentially random output of the decryption algorithm and will also then fail with no image data being obtained (step 114). Most likely, the failure of the decompression step will result in the printer outputting an error message. However, upon failure of the decompression step, the printer could be configured to output a particular message through the user interface or by printing an error page.

In the embodiment presented above, the KEY is preferably provided by the user at the time the print command is issued for an electronic document. This allows the user to select the KEY number for the document, thereby making it easier to remember. In the alternative, it could be arranged that the KEY is automatically generated by the computing device on which the print command is issued. For instance, a random number generator subprogram could provide a new KEY every time a document is printed. This would provide for increased security as the KEY would not be an obvious number that someone familiar with the user could likely guess.

In the above embodiments, the encryption process is carried out by one or more processors within the control system (40) of printer (10). This is advantageous as it places no additional processing burden on the computing device that forwards the document to printer (10). In the alternative, encryption can be carried out by the computing device before the document is forwarded to printer (10) to become a stored print job. In this manner, the KEY used to encrypt the document would never reside on printer (10) until input by a user requesting an authorized print of a stored document. However, this method would require more significant alterations to certain components of the computing device, such as the printer drivers responsible for preparing and moving the electronic document from the computing device to printer (10). Additionally, if data compression is desired, the compression could be performed by the printer driver on the host computer device, followed by encryption. Otherwise, it would be advantageous to carry out the encryption step within printer (10) as encryption must be performed after the document has been compressed.

If even greater security is desired, the KEY-based encryption process of the present specification can be combined with alternative security measures. For example, printer (10) may be configured to incorporate the typical PIN-based file locking method in addition to KEY-based encryption.

In all the embodiments discussed so far, a document is processed or rendered into a printable image file before being saved within memory (50) as a stored print job, or alternatively, encrypted and then saved within memory (50). Alternatively, encryption and storage within memory (50) may be carried out before the document has been rendered into a printable image file. This alternative approach would shorten the amount of time needed to encrypt and store the document within memory (50), but would increase the amount of time it would take to later print the document as it would require rendering the document into a printable image file after it has been decrypted.

If the document is encrypted before being rendered into a printable image file and an incorrect KEY is entered to the decryption algorithm, the decryption algorithm will output essentially random data to a PDL interpreter. The PDL interpreter will be unable to process the data which is not image data in an appropriate PDL. Consequently, an error will occur. The printer may output an error page or message, or may print a number of pages based on the erroneous output of the PDL interpreter. In any event the secured document will not be printed in any intelligible form and will be kept confidential.

While various examples of the principles described herein have been given, it is to be understood that this is by way of illustration and not of limitation, and the scope of the appended claims should be construed as broadly as the prior art will permit.

What is claimed is:

1. A printer, comprising:
    a non-volatile memory for storing at least one print job; and
    a processor with an encryption algorithm;
    wherein a print job sent to said printer and designated for printing at a later time is assigned a key identification number (KEY) and then encrypted by said processor based on said encryption algorithm and said KEY, said encrypted print job is then stored in said non-volatile memory as a secured print job while said KEY associated with said encrypted print job is erased from said printer.

2. The printer according to claim 1, wherein said processor renders said print job into a format ready for printing before encrypting said print job.

3. The printer according to claim 1, further comprising a user interface, wherein a user must provide said KEY associated with said stored encrypted file through said user interface in order to decrypt said stored encrypted print job.

4. The printer according to claim 3, if an incorrect KEY is input through said user interface, said processor fails to accurately decrypt said print job.

5. The printer according to claim 1, wherein said KEY is generated by a user who submitted said print job to said printer.

6. The printer according to claim 1, wherein said KEY is generated by a host computing device that also originates said print job.

7. The printer according to claim 3, wherein said user interface comprises a keypad for entering said KEY to decrypt a secured print job.

8. The printer according to claim 3, wherein said user interface comprises a touch sensitive display screen for entering said KEY to decrypt a secured print job.

9. The printer according to claim 1, wherein said KEY is entered into a host computing device in communication with said printer.

10. The printer according to claim 1, wherein said non-volatile memory is at least one hard disc drive.

11. The printer according to claim 1, wherein said processor further comprises compression means for compressing said print job before encrypting and storing said print job in said local non-volatile memory.

12. The printer according to claim 11, wherein said processor further comprises decompression means for decompressing said compressed print job upon a request of a user to have said print job printed by said printer.

13. The printer according to claim 1, further comprising a personal identification number (PIN) assigned to each print job, wherein said PIN must be entered by a user in order to gain access to said print job stored in said non-volatile memory.

14. The printer according to claim 1, further comprising communication means for connecting said printer to a data network.

15. A method of printing a document, comprising:
    submitting a print job representing said document to a printer;
    obtaining a key identification number (KEY) to be associated with said print job;
    encrypting said print job with said printer based on an encryption algorithm and said KEY;
    deleting said KEY from said printer upon completion of encryption of said print job; and
    storing said encrypted print job in a memory of said printer.

16. The method according to claim 15, further comprising:
    retrieving said encrypted print job for printing;
    inputting said KEY;
    decrypting said print job using said KEY; and
    printing one or more copies of said document from said print job.

17. The method according to claim 16, wherein, if said KEY is incorrectly input for said decrypting, failing to decrypt said print job.

18. The method according to claim 16, further comprising compressing said print job before said encrypting said print job.

19. The method according to claim 16, wherein said submitting of said print job and said inputting of said KEY occur remotely by means of a data network to which said printer is connected.

20. A method of securely printing a document, comprising:
    encrypting a print job representing said document using a key;
    storing the encrypted print job in a printer;
    decrypting said print job when said key is entered through a user interface of said printer; and
    printing the decrypted print job.

21. The method of claim 20, further comprising compressing said print job prior to encryption.

22. The method of claim 20, wherein said encrypting is performed by a processor of said printer.

23. The method of claim 22, further comprising erasing said key from all memory and storage components of said printer after performing encryption using said key.

24. The method of claim 20, further comprising rendering said print job for use by a print engine prior to said encrypting.

25. The method of claim 20, further comprising rendering said print job for use by a print engine after said decrypting.

26. A system for securely printing a document, comprising:
- means for encrypting a print job representing said document using a key;
- means for storing the encrypted print job in a printer;
- means for decrypting said print job when said key is entered through a user interface of said printer; and
- a print engine for printing the decrypted print job.

27. The system of claim 26, further comprising means for compressing said print job prior to encryption.

28. The system of claim 26, wherein said means for encrypting said print job comprise a processor of said printer.

29. The system of claim 28, further comprising means for erasing said key from all memory and storage components of said printer after said key is used by said means for encrypting.

30. The system of claim 26, further comprising means for rendering said print job for use by a print engine before said print job is encrypted.

31. The system of claim 26, further comprising means for rendering said print job for use by a print engine after said print job is decrypted.

* * * * *